United States Patent [19]
Bullock et al.

[11] Patent Number: 6,107,912
[45] Date of Patent: Aug. 22, 2000

[54] WIRELESS MODEM JACK

[75] Inventors: Scott R. Bullock, South Jordan; John M. Knab; Gordon Smith, both of Sandy; David Bartholomew, West Valley, all of Utah

[73] Assignee: Phonex Corporation, Midvale, Utah

[21] Appl. No.: 08/986,864

[22] Filed: Dec. 8, 1997

[51] Int. Cl.$^7$ ................ H04B 1/00; H04H 1/00
[52] U.S. Cl. ................ 340/310.01; 340/310.03; 340/310.08; 375/259; 455/3.3; 455/402
[58] Field of Search .......... 340/310.01, 310.03, 340/310.02, 310.06, 310.08; 375/259; 455/402, 3.3, 6.3

[56] References Cited

U.S. PATENT DOCUMENTS

| | | | |
|---|---|---|---|
| 2,510,273 | 6/1950 | Barstow et al. | 455/402 |
| 2,516,211 | 7/1950 | Hochgraf | 370/276 |
| 2,516,763 | 7/1950 | Edson et al. | 455/402 |
| 2,535,446 | 12/1950 | Mitchell | 455/401 |
| 2,567,908 | 9/1951 | Levy | 340/288 |
| 2,577,731 | 12/1951 | Berger | 370/293 |
| 2,654,805 | 10/1953 | Deer | 455/402 |
| 2,820,097 | 1/1958 | Finlay | 455/400 |
| 2,828,363 | 3/1958 | Ray | 307/204 |
| 2,932,794 | 4/1960 | Crow | 327/105 |
| 3,045,066 | 7/1962 | Beuscher | 455/401 |
| 3,280,259 | 10/1966 | Cotter | 340/310.01 |
| 3,334,185 | 8/1967 | Marlot | 340/310.03 |
| 3,369,078 | 2/1968 | Stradley | 307/3 |
| 3,399,397 | 8/1968 | Josephson | 340/538 |
| 3,400,221 | 9/1968 | Wolters | 455/6.3 |
| 3,475,561 | 10/1969 | Krasin et al. | 379/399 |
| 3,521,267 | 7/1970 | Lester et al. | 340/310.02 |
| 3,529,216 | 9/1970 | Kolm et al. | 361/182 |
| 3,659,280 | 4/1972 | Donohoo | 340/310.03 |
| 3,693,155 | 9/1972 | Crafton et al. | 340/825.02 |
| 3,810,096 | 5/1974 | Kabat et al. | 340/310.07 |
| 3,818,481 | 6/1974 | Dorfman et al. | 340/310.02 |
| 3,846,638 | 11/1974 | Wetherell | 370/3 |
| 3,852,740 | 12/1974 | Haymes | 340/538 |
| 3,876,984 | 4/1975 | Chertok | 340/823.58 |
| 3,911,415 | 10/1975 | Whyte | 340/310.03 |

(List continued on next page.)

FOREIGN PATENT DOCUMENTS

| | | |
|---|---|---|
| 12488/76 | 6/1977 | Australia . |
| 1057436 | 6/1979 | Canada . |
| 1 216 689 | 1/1987 | Canada . |
| 0 078 171 | 10/1982 | European Pat. Off. . |
| 000 555 869 A2 | 8/1993 | European Pat. Off. . |
| 2 094 598 | 2/1982 | United Kingdom . |
| PCT/US88/ 01707 | 5/1988 | WIPO . |
| PCT/US90/ 02291 | 4/1990 | WIPO . |
| PCT/US90/ 06701 | 11/1990 | WIPO . |
| PCT/US92/ 08510 | 10/1992 | WIPO . |
| PCT/US93/ 04726 | 5/1993 | WIPO . |
| PCT/US94/ 03100 | 3/1994 | WIPO . |
| PCT/US95/ 00354 | 1/1995 | WIPO . |

*Primary Examiner*—Donnie L. Crosland
*Attorney, Agent, or Firm*—Lloyd W. Sadler

[57] ABSTRACT

A wireless power line carrier data communication device is provided. The device is specifically adapted to meet the requirements of high-speed modem data transmission, such as is typically required by digital computer networks and similar devices. The device employs an improved power line transmitter power output which reduces the effect of harmonic distortion and also employs a bit-stream sine wave generator with a digital to analog converter to producing a sine wave for the sub-audio carrier signal, which also reduces the effects of harmonic distortion. The device is specifically designed for data transfer over the AC power lines and is compatible with standard AC power signals as well as standard modem equipment and standard telephone connections.

3 Claims, 3 Drawing Sheets

U.S. PATENT DOCUMENTS

| | | | |
|---|---|---|---|
| 3,922,664 | 11/1975 | Wadsworth | 340/517 |
| 3,924,223 | 12/1975 | Whyte et al. | 340/310.05 |
| 3,925,728 | 12/1975 | Whyte | 340/310.05 |
| 3,925,763 | 12/1975 | Wadhwani et al. | 340/539 |
| 3,942,168 | 3/1976 | Whyte | 340/310.01 |
| 3,949,172 | 4/1976 | Brown et al. | 455/402 |
| 3,967,264 | 6/1976 | Whyte et al. | 340/310.08 |
| 3,973,087 | 8/1976 | Fong | 340/310.06 |
| 3,980,954 | 9/1976 | Whyte | 340/310.02 |
| 4,012,733 | 3/1977 | Whyte | 340/310.05 |
| 4,012,734 | 3/1977 | Jagoda et al. | 340/310.01 |
| 4,016,429 | 4/1977 | Vercellotti et al. | 340/310.06 |
| 4,057,793 | 11/1977 | Johnson et al. | 340/310.07 |
| 4,058,678 | 11/1977 | Dunn et al. | 340/310.07 |
| 4,065,763 | 12/1977 | Whyte et al. | 340/310.05 |
| 4,107,656 | 8/1978 | Farnsworth | 340/825.15 |
| 4,161,027 | 7/1979 | Russell | 700/293 |
| 4,173,754 | 11/1979 | Feiker | 340/310 R |
| 4,174,517 | 11/1979 | Mandel | 340/310 A |
| 4,218,655 | 8/1980 | Johnston et al. | 455/39 |
| 4,222,035 | 9/1980 | Lohoff | 340/167 R |
| 4,239,940 | 12/1980 | Dorfman | 179/2.51 |
| 4,254,403 | 3/1981 | Perez-Cavero et al. | 340/310 R |
| 4,307,380 | 12/1981 | Gander | 340/310 R |
| 4,321,581 | 3/1982 | Tappeiner et al. | 340/310 R |
| 4,323,882 | 4/1982 | Gajjar | 340/310 R |
| 4,344,066 | 8/1982 | Beggs | 340/310 A |
| 4,357,598 | 11/1982 | Melvin, Jr. | 340/310 A |
| 4,371,867 | 2/1983 | Gander | 340/310 R |
| 4,377,804 | 3/1983 | Suzuki | 340/310 A |
| 4,386,436 | 5/1983 | Kocher et al. | 455/151 |
| 4,400,688 | 8/1983 | Johnston et al. | 340/310 R |
| 4,408,185 | 10/1983 | Rasmussen | 340/310 A |
| 4,408,186 | 10/1983 | Howell | 340/310 A |
| 4,429,299 | 1/1984 | Kabat et al. | 340/310 R |
| 4,433,326 | 2/1984 | Howell | 340/310 A |
| 4,442,319 | 4/1984 | Treidl | 179/2 A |
| 4,471,399 | 9/1984 | Udren | 361/64 |
| 4,473,817 | 9/1984 | Perkins | 340/310 R |
| 4,475,193 | 10/1984 | Brown | 370/124 |
| 4,479,033 | 10/1984 | Brown et al. | 179/2.51 |
| 4,495,386 | 1/1985 | Brown et al. | 179/2.51 |
| 4,514,594 | 4/1985 | Brown et al. | 179/2.51 |
| 4,523,307 | 6/1985 | Brown et al. | 370/30 |
| 4,535,447 | 8/1985 | Rosanes et al. | 370/77 |
| 4,538,136 | 8/1985 | Drabing | 340/310 R |
| 4,556,864 | 12/1985 | Roy | 340/310 A |
| 4,556,865 | 12/1985 | Fukagawa et al. | 340/310 R |
| 4,556,866 | 12/1985 | Gorecki | 340/310 A |
| 4,559,520 | 12/1985 | Johnston | 340/310 R |
| 4,599,598 | 7/1986 | Komoda et al. | 340/310 A |
| 4,609,839 | 9/1986 | Howell | 307/542 |
| 4,611,274 | 9/1986 | Machino et al. | 364/200 |
| 4,633,218 | 12/1986 | Palsgrove et al. | 340/310 A |
| 4,638,298 | 1/1987 | Spiro | 340/827 |
| 4,638,299 | 1/1987 | Campbell | 340/310 A |
| 4,641,126 | 2/1987 | Crowe | 340/310 A |
| 4,641,322 | 2/1987 | Hasegawa | 375/1 |
| 4,642,607 | 2/1987 | Strom et al. | 340/310 A |
| 4,644,321 | 2/1987 | Kennon | 340/310 A |
| 4,675,648 | 6/1987 | Roth et al. | 340/310 A |
| 4,701,945 | 10/1987 | Pedigo | 379/66 |
| 4,745,391 | 5/1988 | Gajjar | 340/310 A |
| 4,745,392 | 5/1988 | Ise et al. | 340/310 R |
| 4,746,897 | 5/1988 | Shuey | 340/310 R |
| 4,749,992 | 6/1988 | Fitzemeyer et al. | 340/870.02 |
| 4,759,016 | 7/1988 | Otsuka | 370/95 |
| 4,763,103 | 8/1988 | Galula et al. | 340/310 R |
| 4,772,870 | 9/1988 | Reyes | 340/310 R |
| 4,774,493 | 9/1988 | Rabinowitz | 340/310 A |
| 4,783,780 | 11/1988 | Alexis | 370/95 |
| 4,788,527 | 11/1988 | Johansson | 340/310 A |
| 4,809,296 | 2/1989 | Braun et al. | 375/1 |
| 4,829,570 | 5/1989 | Schotz | 381/3 |
| 4,835,517 | 5/1989 | van der Gracht et al. | 340/310 A |
| 4,845,466 | 7/1989 | Hariton et al. | 340/310 R |
| 4,847,903 | 7/1989 | Schotz | 381/3 |
| 4,864,589 | 9/1989 | Endo | 375/1 |
| 4,866,733 | 9/1989 | Morishita | 375/1 |
| 4,890,089 | 12/1989 | Shuey | 340/310 A |
| 4,912,553 | 3/1990 | Pal et al. | 358/86 |
| 4,962,496 | 10/1990 | Vercellotti et al. | 370/11 |
| 4,963,853 | 10/1990 | Mak | 340/310 A |
| 4,968,970 | 11/1990 | LaPorte | 340/310 A |
| 4,988,972 | 1/1991 | Takagi | 340/310 A |
| 4,995,053 | 2/1991 | Simpson et al. | 375/1 |
| 5,003,457 | 3/1991 | Ikei et al. | 364/133 |
| 5,032,833 | 7/1991 | Laport | 340/825.02 |
| 5,049,876 | 9/1991 | Kahle et al. | 340/825.57 |
| 5,051,720 | 9/1991 | Kittirutsunetown | 340/310.01 |
| 5,063,563 | 11/1991 | Ikeda et al. | 370/110.1 |
| 5,065,133 | 11/1991 | Howard | 340/310 A |
| 5,066,939 | 11/1991 | Mansfield, Jr. | 340/310 R |
| 5,136,612 | 8/1992 | Bi | 375/1 |
| 5,151,838 | 9/1992 | Dockery | 340/310 R |
| 5,155,466 | 10/1992 | Go | 340/310 R |
| 5,168,510 | 12/1992 | Hill | 375/40 |
| 5,187,865 | 2/1993 | Dolin, Jr. | 29/868 |
| 5,192,231 | 3/1993 | Dolin, Jr. | 439/620 |
| 5,210,518 | 5/1993 | Graham et al. | 340/310 R |
| 5,241,283 | 8/1993 | Sutterlin | 330/51 |
| 5,257,006 | 10/1993 | Graham et al. | 340/310 A |
| 5,262,755 | 11/1993 | Mak et al. | 340/310 R |
| 5,268,666 | 12/1993 | Michel et al. | 340/310.01 |
| 5,274,699 | 12/1993 | Rang | 379/142 |
| 5,278,862 | 1/1994 | Vender Mey | 375/1 |
| 5,289,476 | 2/1994 | Johnson et al. | 371/37.1 |
| 5,319,634 | 6/1994 | Bartholomew et al. | 370/18 |
| 5,327,230 | 7/1994 | Dockery | 348/8 |
| 5,349,644 | 9/1994 | Massey et al. | 395/200 |
| 5,351,272 | 9/1994 | Abraham | 375/38 |
| 5,355,114 | 10/1994 | Sutterlin et al. | 340/310 A |
| 5,357,541 | 10/1994 | Cowart | 375/1 |
| 5,404,127 | 4/1995 | Lee et al. | 340/310.02 |
| 5,406,248 | 4/1995 | Le Van Suu | 340/310.01 |
| 5,406,249 | 4/1995 | Pettus | 340/310.06 |
| 5,410,292 | 4/1995 | Le Van Suu | 340/310.06 |
| 5,412,369 | 5/1995 | Kirchner | 340/310.03 |
| 5,424,709 | 6/1995 | Tal | 340/310.01 |
| 5,448,593 | 9/1995 | Hill | 375/267 |
| 5,452,344 | 9/1995 | Larson | 379/107 |
| 5,461,629 | 10/1995 | Sutterlin et al. | 371/30 |
| 5,463,662 | 10/1995 | Sutterlin et al. | 375/351 |
| 5,467,011 | 11/1995 | Hunt | 324/67 |
| 5,471,190 | 11/1995 | Zimmermann | 340/310.01 |
| 5,504,454 | 4/1996 | Daggett et al. | 329/304 |
| 5,530,741 | 6/1996 | Rubin | 379/142 |
| 5,550,905 | 8/1996 | Silverman | 379/142 |
| 5,554,968 | 9/1996 | Lee | 340/310.01 |
| 5,559,377 | 9/1996 | Abraham | 307/104 |
| 5,630,204 | 5/1997 | Hylton et al. | 455/3.3 |
| 5,835,005 | 11/1998 | Furukawa et al. | 340/310.01 |
| 5,911,119 | 6/1999 | Bartholomew et al. | 455/402 |

WIRELESS MODEM JACK

BACKGROUND OF THE INVENTION

1. Field of the Invention

This invention relates to electronic communications systems for computers and other electronic equipment. More specifically, this invention relates to the connection between modems and AC power lines for communicating between a computer, or similar device, and a telephone line for data communications.

2. Description of Related Art

A variety of power line carrier telephone voice and/or data communication systems have been developed and are used to facilitate telephonic communications in locations where little or no availability exists for dedicated telephone wires. While these devices provide a voice and/or data connection to the existing power lines they typically do not include features for improving power output and reducing harmonics. This invention provides a significant improvement over prior techniques by use of a design which optimizes the power line data communication channel for data transfer. Prior systems for power line communications, to which the reader is directed for background, includes the following United States and foreign patent documents: 2,510,273, 2,516,211, 2,516,763, 2,535,446, 2,567,908, 2,577,731, 2,654,805, 2,820,097, 2,828,363, 2,932,794, 3,045,066, 3,280,259, 3,334,185, 3,369,078, 3,399,397, 3,400,221, 3,475,561, 3,521,267, 3,529,216, 3,659,280, 3,693,155, 3,810,096, 3,818,481, 3,846,638, 3,852,740, 3,876,984, 3,911,415, 3,922,664, 3,924,223, 3,925,763, 3,925,728, 3,942,168, 3,949,172, 3,967,264, 3,973,087, 3,980,954, 4,012,733, 4,012,734, 4,016,429, 4,057,793, 4,058,678, 4,065,763, 4,107,656, 4,161,027, 4,173,754, 4,174,517, 4,218,655, 4,222,035, 4,239,940, 4,254,403, 4,307,380, 4,321,581, 4,323,882, 4,344,066, 4,357,598, 4,371,867, 4,377,804, 4,386,436, 4,400,688, 4,408,185, 4,408,186, 4,429,299, 4,433,326, 4,442,319, 4,471,399, 4,473,817, 4,475,193, 4,479,033, 4,495,386, 4,514,594, 4,523,307, 4,535,447, 4,538,136, 4,556,864, 4,556,865, 4,556,866, 4,559,520, 4,599,598, 4,609,839, 4,611,274, 4,633,218, 4,638,298, 4,638,299, 4,641,126, 4,641,322, 4,642,607, 4,644,321, 4,675,648, 4,701,945, 4,745,391, 4,745,392, 4,746,897, 4,749,992, 4,759,016, 4,763,103, 4,772,870, 4,774,493, 4,783,780, 4,788,527, 4,809,296, 4,829,570, 4,835,517, 4,845,466, 4,847,903, 4,864,589, 4,866,733, 4,890,089, 4,912,553, 4,962,496, 4,963,853, 4,968,970, 4,988,972, 4,995,053, 5,003,457, 5,032,833, 5,049,876, 5,063,563, 5,065,133, 5,066,939, 5,136,612, 5,151,838, 5,155,466, 5,168,510, 5,187,865, 5,192,231, 5,210,518, 5,241,283, 5,257,006, 5,262,755, 5,278,862, 5,289,476, 5,319,634, 5,327,230, 5,349,644, 5,351,272, 5,355,114, 5,357,541, 5,404,127, 5,406,248, 5,406,249, 5,410,292, 5,412,369, 5,424,709, 5,448,593, 5,452,344, 5,461,629, 5,463,662, 5,467,011, 5,471,190, 5,504,454, 5,554,968, 5,559,377, 5,630,204, GB 2,094,598, AU-B1-12,488/76, Canada 1057436, Canada 1216689, EPO 0 078 171 A2, EPO 0 555 869 A2, PCT/US83/01717, PCT/US90/02291, PCT/US90/06701, PCT/US92/08510, PCT/US93/04726, PCT/US94/03110, and PCT/US95/00354 each of which is hereby incorporated by reference in its entirety for the material disclosed therein.

SUMMARY OF THE INVENTION

It is desirable to provide a means for connecting a computer to a telephone line, for further connection to a network, the internet or the like, via an AC power line. It is particularly desirable to provide a device which provides improved power output, reduced undesirable harmonic effects and is otherwise designed specifically to be optimized for wireless data transfer over AC power lines. Wireless, power line carrier, data communications systems provide many important advantages to computer users. This is particularly the case where standard telephone jacks are limited or unavailable and where AC power outlets are readily available to the computer user. Many of the advantages are discussed in the previously cited patent literature. However, typical prior power line carrier systems which have been designed to meet the requirements of typical voice communication signals are often inadequate when it comes to meeting the more stringent requirements of high speed digital communications between computer systems. It is desirable to provide a wireless power line communication system which provides the improved signal to noise ratio characteristics required for consistent and reliable communication.

Accordingly, it is the primary object of this invention to provide a wireless power line carrier communication system which provides improved transmitter power output.

Another object of this invention is to provide a wireless power line carrier communication system which provides reduced harmonics.

A further object of this invention is to provide a wireless power line carrier communication system which uses frequencies selected to provide optimal separation between the transmitter and the receiver.

It is still another object of this invention to provide a wireless power line carrier communication system which uses a bit-stream sine wave generator to produce a sine wave digitally which has minimal harmonics.

It is a further object of this invention to provide a wireless power line carrier communication system which avoids digital data degradation caused by FM noise reduction circuitry.

A further object of this invention is to provide a wireless power line carrier communication system which provides full-duplex communication.

A still further object of this invention is to provide a wireless power line carrier communication system which is easily adaptable to operate with standard digital modem devices.

Another object of this invention is to provide a wireless power line carrier communication system which is easily connected to standard two-phase AC power lines.

A further object of this invention is to provide a wireless power line carrier communication system which provides improved audio fidelity.

A still further object of this invention is to provide a wireless power line carrier communication system which has enhanced return loss resulting in lower signal reflections.

Another object of this invention is to provide a wireless power line carrier communication system which has improved phone line interface performance.

Another object of this invention is to provide a wireless power line carrier communication system which is adapted to receive caller identification tones.

Another object of this invention is to provide a wireless power line carrier communication system which provides improved combining of caller-ID, standard audio and system data.

Additional objects, advantages, and other novel features of this invention will be set forth in part in the description that follows and in part will become apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiment of this invention, simply by way of illustration of one of the modes best suited to carry out this invention. As it will be realized, this invention is capable of other different embodiments, and its several details, and specific electronic circuits, are capable of modification in various aspects without departing from the invention. Accordingly, the drawings and descriptions should be regarded as illustrative in nature and not as restrictive.

To achieve the foregoing and other objectives, and in accordance with the purposes of the present invention, a power line extension unit and a power line base unit are provided. The extension unit includes a Subscriber Line interface Circuit (SLIC), a microcontroller, a hybrid circuit for providing a mute function and a separating incoming and outgoing signals, a transmit (XMIT) oscillator, a transmitter, a receiver, an audio/data filter, and a improved power supply. The base unit includes a Central Office Line Interface Circuit (COLIC), a hybrid circuit, a trasmit (XMIT) oscillator, a transmitter, a receiver, a low pass filter, control logic and an improved power supply.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
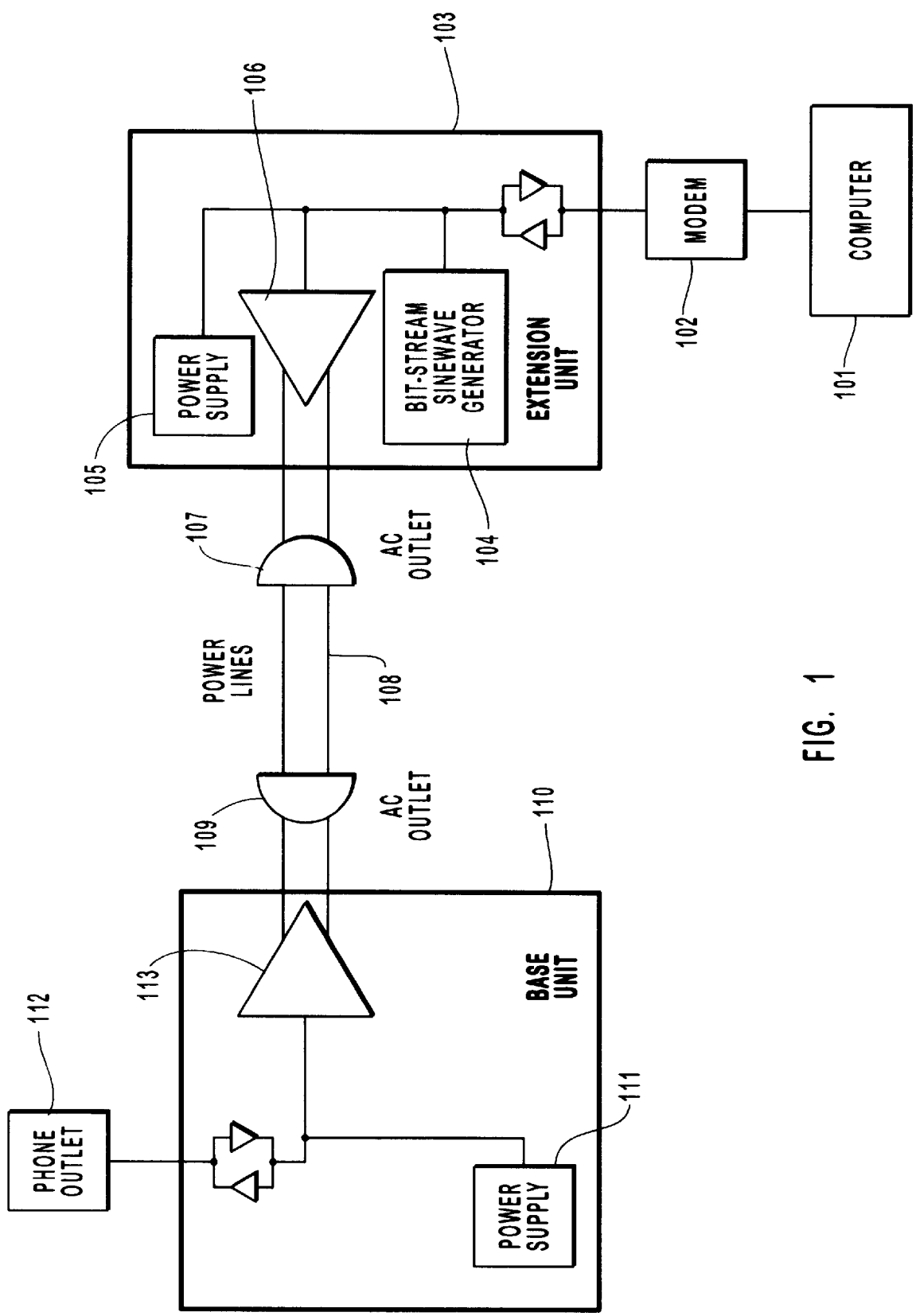
FIG. 1 is a top level block diagram showing the major sections of the invention.

FIG. 1 shows a top level block diagram of the major sections of the invention. In its preferred embodiment, this invention works with a standard digital computer system 101 which is electrically connected through a standard modem 102 to the extension unit 103 of the invention. The extension unit 103 includes a number of subsections which are shown in additional detail in FIGS. 2 through 10 and described below, however, essential to the improved performance of this invention for digital communications are the bit-stream sine wave generator 104 and the specific power amplifier circuits 106, 113. The bit-stream sine wave generator 104 is used to produce a sine wave digitally with minimal harmonic distortion when compared to the square wave output signal. This bit-stream sine wave generator 104 is used for the sub-audio carrier signal. The sub-audio carrier signal is used to establish the communication link between the base unit 110 and the extension unit 103, by modulating the output voltage controlled oscillator. The modulated output voltage controlled oscillator is detected in the base unit 110, which thereby is informed of the presence of the extension unit 103 on the power line. The sub-audio carrier is commonly referred to as the 1 Hertz signal. The improved power amplifiers 106, 113 provides increased power output with a linear, sinusoidal power output for reduced harmonic distortion, a specific frequency selection for optimal separation between the transmitter and the receiver, thereby minimizing self-induced interference. The power amplifier 106, of the extension unit 103, includes a transceiver for imposing the analog signal from the modem 103 on the AC power lines 108. The transceiver 106 is electrically connected to the AC power lines 108 through a standard AC wall outlet 107. At another AC wall outlet 109 the base unit 110 is connected into the power line signal path. The power amplifier 113, of the base unit 110, includes a second transceiver in the base unit 110 for communicating with the extension unit 103 across the power lines 108. Further details on the internal operation of the base unit 110 is provided below and in FIGS. 11 through 19. An improved power supply 111 circuit is provided in the base unit 110. The base unit 110 communicates with a standard telephone line through an electrical connection to a standard phone outlet 112.

Figure 2:
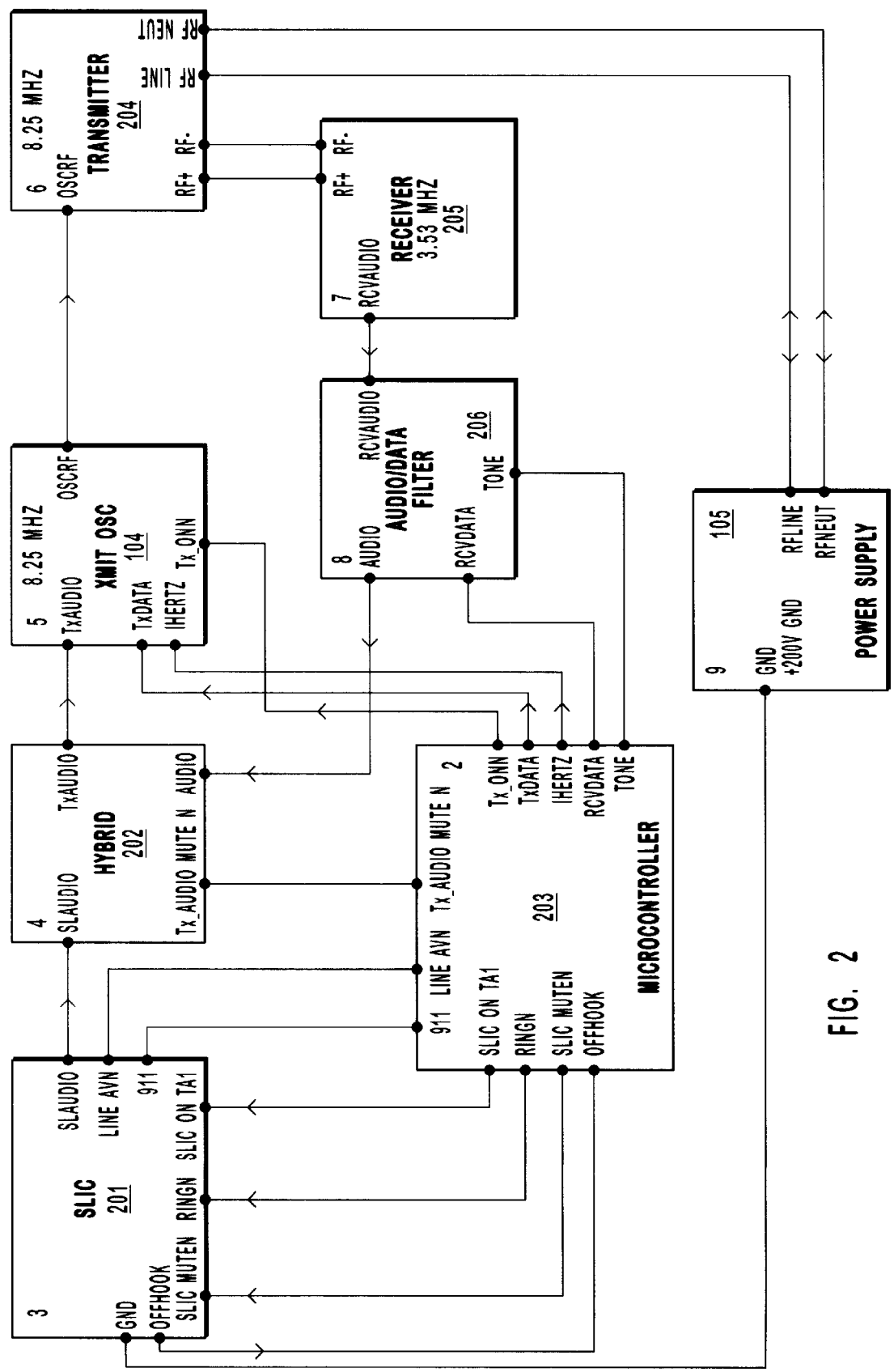
FIG. 2 is a detailed block diagram of the preferred embodiment of the extension unit of the invention.

FIG. 2 shows the detailed block diagram of the preferred embodiment of the extension unit 103 of the invention. A microcontroller 203 is provided to control the functions of the extension unit 103. In the preferred embodiment of the microcontroller 203 the bit stream 1 Hertz signal is generated using a 1 bit digital to analog converter (DAC). The current best mode of the bit stream 1 Hertz signal generator uses a Z86E08 digital circuit, the output of which is subsequently filtered using an RC network, the preferred values of which are 10k Ω and 47 μF. A subscriber line interface circuit (SLIC) 201 is provided to receive the modem connection, typically an RJ-11 connector is used, from the modem 102. A hybrid circuit 202 is provided to remove the received signal from the transmitted signal. A transmit oscillator (XMIT OSC) 104 is provided to modulate the carrier signal using the audio signal from the hybrid circuit 202 and generates the sine wave carrier signal for the transmitter 204. In the preferred embodiment of the invention the transmit oscillator 104 is a voltage controlled oscillator (VCO). The transmitter 204 receives the sine wave carrier signal from the XMIT OSC 104 and produces the line carrier signals for transmitting across the power lines 108. A receiver 205 is provided to receive power line signals from the base unit 110. An audio/data filter 206 receives the received signal from the receiver 205, filters the audio signals and extracts the digital control data signals which are intended for internal system control. The power supply circuit 105 is provided to supply power to system components and to provide RF connections to receive and transmit modem and control signals to and from the transmitter 204 interface with the AC power lines 108.

Figure 3:
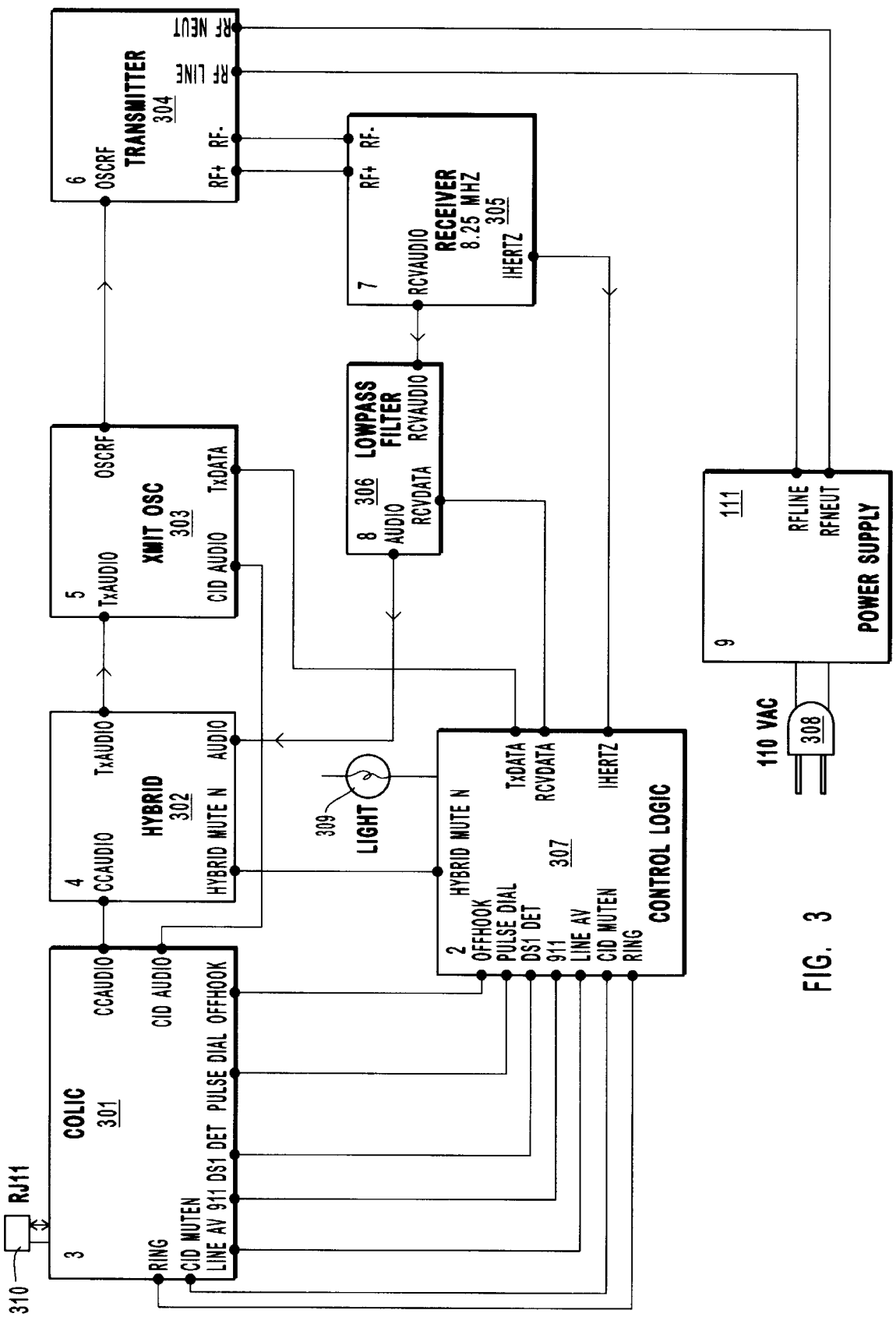
FIG. 3 is a detailed block diagram of the preferred embodiment of the base unit of the invention.

FIG. 3 shows the detailed block diagram of the preferred embodiment of the base unit 110 of the invention. Control logic is provided 307 to control the functions of the base unit 110. The sub-audio signal is detected in the control logic section 307. In the current preferred embodiment of the invention a Z86E80 digital circuit is used in this detection function. Also provided attached to the preferred embodiment of the invention is an indicator light 309 to provide visual indication of the operation of the base unit 110. A carrier line interface circuit (COLIC) 301 is provided to send and receive the digital modem signals, typically through an RJ-11 310 connector, from the standard wall telephone outlet 112. Within the COLIC 301 a caller-ID circuit is provided in the preferred embodiment of the invention. A hybrid circuit 302 is provided to remove the receive signal from the transmitted signal at the two-wire interface. A transmit oscillator (XMIT OSC) 303 is provided to receive the transmitted signal from the hybrid circuit 302 and to generate the carrier signal for the transmitter 304. In the preferred embodiment of the XMIT OSC a voltage controlled oscillator (VCO) is provided and used. The transmitter 304 receives the carrier signal from the XMIT OSC 303 and produces a sine wave carrier signal for transmitting across the power lines 108 to the extension unit 103. A receiver 305 is provided which receives power line signals from the extension unit 103. The lowpass filter 306 receives the received signal from the receiver 305, filters this signal and splits off digital system data from any audio signal. The power supply circuit 111 is provided to power the other base components and to provide the connections for the received and transmitted carrier signals to and from the transmitter 304 interfacing with the AC power lines 108, via a standard two or three prong AC plug 308. Typically the AC power lines 108 provide 110 VAC, however, alternative power systems are compatible with the concept of this invention.

The foregoing description is of a preferred embodiment of the invention and has been presented for the purposes of illustration and description of the best mode of the invention currently known to the inventors. It is not intended to be exhaustive or to limit the invention to the precise form, connections, or choice of components disclosed. Obvious modifications or variations are possible and foreseeable in light of the above teachings. This embodiment of the invention was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when they are interpreted in accordance with the breadth to which they are fairly, legally and equitably entitled.

We claim:

1. A wireless communication apparatus adapted specifically to communication between a digital modem and a standard telephone line over standard AC power lines, comprising:

(A) a base unit connected to a standard telephone line and to an AC power line for the transmission and receipt of modem data signals;

(B) an extension unit connected to a standard digital computer modem and to an AC power line for transmission and receipt of modem data signals;

(C) a linear, sinusoidal power amplifier transmitter, within said extension unit and in electrical communication with said AC power line, adapted to reduce harmonic distortion of data transmitted over said AC power line; and (D) a bit-stream sine wave generator, within said extension unit and in electrical communication with said linear, sinusoidal power amplifier transmitter, adapted to produce a sine wave to minimize harmonic distortion.

2. A wireless communications apparatus as recited in claim 1, the base unit further comprising:

(i) a first transmitter transmitting signals to the AC power lines;

(ii) a first receiver receiving signals from the AC power lines; and (iii) a first controller controlling the receipt and transmission of signals across the AC power lines, wherein said controller communicates electronically with said first transmitter and said first receiver.

3. A wireless communications apparatus as recited in claim 1, the extension unit further comprising:

(i) a second transmitter transmitting signals to the AC power lines;

(ii) a second receiver receiving signals from the AC power lines, and (iii) a second controller controlling the receipt and transmission of signals across the AC power lines, wherein said second controller communicates electronically with said second transmitter and said second receiver.

* * * * *